United States Patent [19]

Kamibayashi

[11] Patent Number: 4,862,852

[45] Date of Patent: Sep. 5, 1989

[54] THROTTLE CONTROL APPARATUS

[75] Inventor: Isao Kamibayashi, Himeji, Japan

[73] Assignee: Sougou Jidousya Anzen Kougai Gijutsu Kenkyu Kumiai, Himeji, Japan

[21] Appl. No.: 204,548

[22] Filed: Jun. 9, 1988

[30] Foreign Application Priority Data

Jun. 9, 1987 [JP] Japan ................................ 62-144388

[51] Int. Cl.[4] ...................... F02D 11/10; B60K 28/16; B60K 31/02

[52] U.S. Cl. .................................... 123/342; 123/361; 180/178; 180/197

[58] Field of Search ............... 123/340, 342, 352, 361, 123/399, 396; 180/178, 179, 197

[56] References Cited

U.S. PATENT DOCUMENTS 4,524,843 6/1985 Class et al. ...................... 123/352 X
4,703,823 11/1987 Yogo et al. ..................... 123/399 X
4,727,840 3/1988 Nishida et al. .

FOREIGN PATENT DOCUMENTS 27570 6/1986 Japan .
272423 12/1986 Japan .

*Primary Examiner*—Tony M. Argenbright
*Attorney, Agent, or Firm*—Oblon, Spivak, McClelland, Maier & Neustadt

[57] ABSTRACT

Disclosed is a throttle control apparatus which includes a rack gear box which is adapted to be connected to a throttle wire for operating a throttle valve and is urged to the initial stage by a throttle return spring, and accelerator actuator which is arranged in the rack gear box, is adapted to be connected to an accelerator wire interlocked with an accelerator pedal and is urged to the initial stage by an accelerator return spring, a rack gear which is provided on the outer surface of the rack gear box, a driving motor including a pinion gear engaged with the rack gear through a clutch, and a pulley and a spring for urging the accelerator wire in a direction perpendicular to the moving direction of the accelerator wire.

2 Claims, 1 Drawing Sheet

THROTTLE CONTROL APPARATUS

BACKGROUND OF THE INVENTION

1. FIELD OF THE INVENTION

The present invention relates to a throttle control apparatus for an automobile. More particularly, it relates to a throttle control apparatus capable of switching controlling operations between a constant-speed cruising control and a traction control.

2. DISCUSSION OF BACKGROUND

Traction controls at the time of starting of a conventional automobile have been carried out, for instance, as follows:

When slippage of the automobile takes place,

1. A driver operates the accelerator pedal toward the returning position.
2. He throttles the throttle valve by using a constant-speed cruising device.
3. He operates the anti-skid brake to control the slippage of the tires.

In the conventional traction control, the control for throttling the throttle valve and the control of slippage by the brake have been separately carried out.

In order to let an automobile start smoothly, it is desirable that the throttling control for the throttle valve and the slip restraint control by means of the brake be carried out in an associated relation.

SUMMARY OF THE INVENTION

It is an object of the present invention to provide a throttle control apparatus suitably used in a combined traction control, wherein the throttling control of the throttle valve and the slip restraint control can be interlocked.

The foregoing and the other objects of the present invention have been attained by providing a throttle control device for an automobile which comprises a rack gear box adapted to be connected to a throttle wire, an accelerator actuator arranged in the rack gear box and adapted to be connected to an accelerator wire, a pinion gear engaged with the rack gear on the outer surface of the rack gear box so as to be driven by a driving motor through a clutch connected to its output shaft, and a pulley and a spring for urging the accelerator wire in a direction perpendicular to the moving direction of the accelerator wire.

In accordance with the present invention, in the nomal cruising control, when the accelerator pedal is depressed to draw the accelerator wire, the throttle wire is drawn together with, the rack gear box to open the throttle valve. Under traction control, when a slip caused by depressing the accelerator pedal suddenly is detected, the driving motor and the clutch are activated to move the rack gear box in the direction opposite to the accelerator wire through the pinion gear so as to control the throttle valve in the throttling direction. Under constant speed cruising control, the driving motor is driven in the direction opposite to the rotation of the driving motor in the traction control to move the rack gear box toward the accelerator wire so as to increase the opening of the throttle valve

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, an embodiment of the present invention will be described in reference to the accompanying drawings.

Figure 1A:
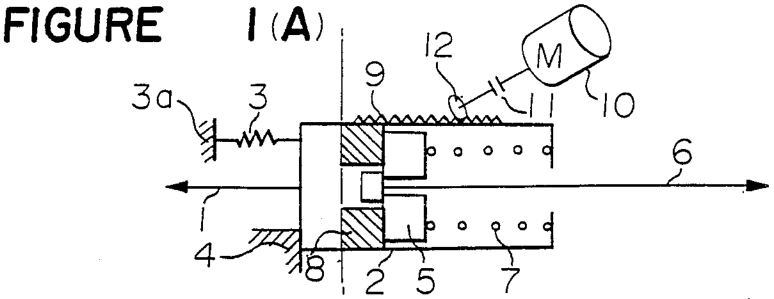
FIG. 1 (A) through FIG. 1 (E) are drawings to help explain the operations of the respective controls in a throttle control apparatus of an embodiment according to the present invention.
Figure 1B:
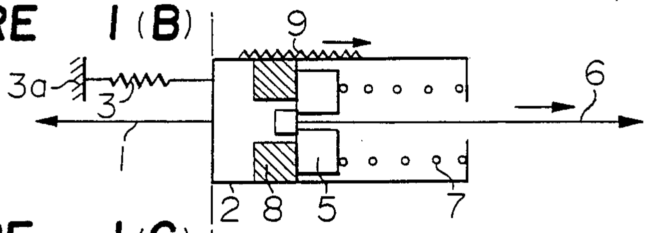
Figure 1C:
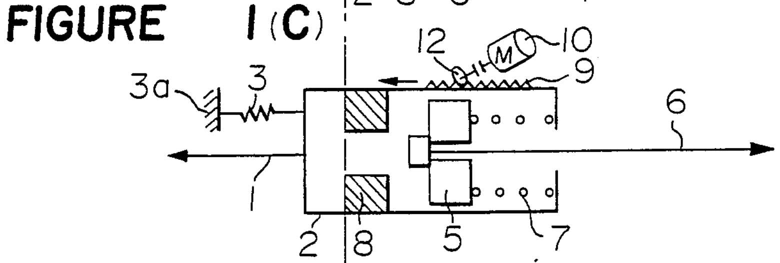
Figure 1D:
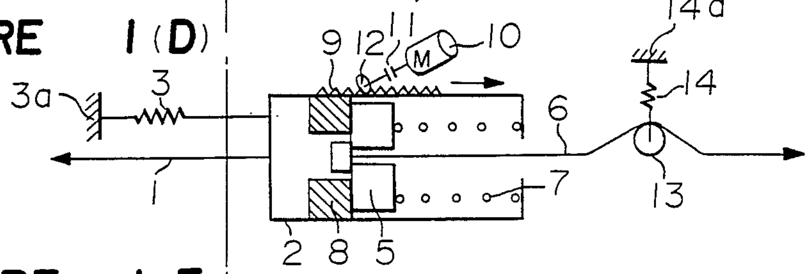
Figure 1E:
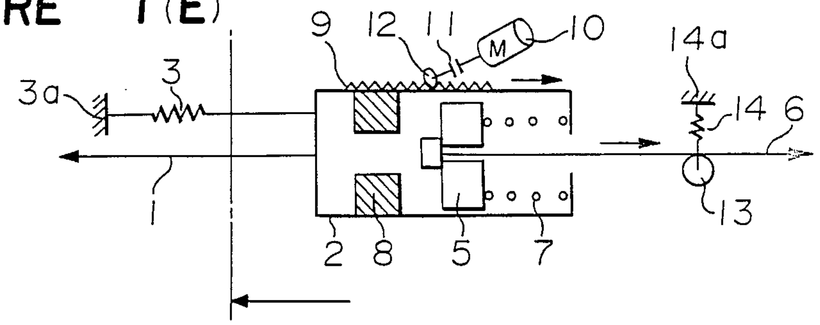

FIG. 1 (A) through FIG. 1 (E) are drawings to help explain the operation in the throttle control apparatus according to the present invention. Reference numeral 1 designates a throttle wire for controlling the opening of a throttle valve (not shown). Reference numeral 2 designates a rack gear box connected to the throttle wire 1. Reference numeral 3 designates a throttle return spring which is supported by a stationary part 3*a* of an automobile to press the rack gear box 2 against a stopper 4 so as to urge the rack gear box to the original position. Reference numeral 5 designates an accelerator actuator which is arranged in the rack gear box 2. Reference numeral 6 designates an accelerator wire which is connected to the accelerator actuator 5 and is interlocked with an accelerator pedal (not shown). Reference numeral 7 designates an accelerator return spring which is arranged in the rack gear box and presses the accelerator actuator 5 against a stopper 8 in the rack gear box to urge the accelerator actuator back to the original position. Reference numeral 9 designates a rack gear which is provided on the outer circumferential surface of the rack gear box 2 and which is engaged with a pinion gear 12 driven by a driving motor 10 through a clutch 11 connected to the output shaft of the motor. Reference numeral 13 designates a pulley over which the accelerator wire 6 is passed, and which is urged in a direction perpendicular to the moving direction of the accelerator wire 6 under the action of a pulley return spring 14 which is placed between the pulley 13 and a stationary part 14*a* of the automobile.

Now, the operation of the throttle control apparatus according to the present invention will be explained.

Initial stage

In the initial stage (i.e. when the power source is off), as shown in FIG. 1 (A), the rack gear box 2 is pressed against the stopper 4 under the spring action of the throttle return spring 3 so as to be positioned in the original position. The accelerator actuator 5 is pressed against the stopper 8 under the spring action of the accelerator return spring 7 so as to be positioned in the original position.

Normal cruising control

In the normal cruising, when the accelerator pedal is depressed, the accelerator wire 6 is drawn in the direction indicated by an arrow in FIG. 1 (B). If the drawing force is stronger than the urging force of the throttle return spring 3, the rack gear box 2 is moved away from the stopper 4. As a result, the throttle wire 1 is drawn so as to open the throttle valve to a predetermined opening degree to control the car speed according to the opening degree of.the throttle valve. At this time, the driving motor 10 and the clutch 11 are in the off state.

Traction control

At the time of starting the automobile for manual cruising, if one of the tires of the automobile is slips due to a sudden depression of the accelerator pedal, a slip sensor (not shown) in a braking device detects the occurence of slip and outputs a detection signal. In response to the detection signal, the driving motor 10 and the clutch 11 are turned on to move the rack gear box 2 in the direction opposite to the moving direction of the accelerator wire 6 by the rotation of the pinion gear 12 through the rack gear 9 as shown in FIG. 1 (C). As a result, the throttle valve is controlled toward the throttling direction. This throttling control terminates when the slip detection signal ceases. After that, the driving motor 10 is, reversely driven to increase the opening degree of the throttle valve to return the throttle valve to the operning degree at the initial stage, and then the motor 10 and the clutch 11 are turned off and the traction control terminates.

Constant speed cruising control

Under constant speed cruising, the motor 10 and the clutch 11 are turned on. The motor 10 is driven in the rotational direction opposite to that under traction control to move the rack gear box 2 toward the accelerator wire 6 as shown in FIG. 1 (D). When movement o the gear box 2 causes the throttle valve to be opened through the throttle wire 1 so as to make the deviation in car speed become 0, the opening degree of the throttle valve at that time is maintained to set the constant speed cruising operation. The slack in the accelerator wire 6 caused at that time is automatically absorbed by the tension given by the pulley 13 and the pulley return spring 14.

Switching off the constant speed cruising control

When the constant speed cruising control is switched off, the motor 10 and the clutch 11 are turned off. If the drawing force by the accelerator wire 6 caused by depressing the accelerator pedal exceeds the spring urging force by the accelerator return spring 7, the accelerator actuator 5 is moved together with the accelerator wire 6 in the direction away from the stopper 8 to increase the opening degree of the throttle valve as shown in FIG. 1 (E). After that, the cruising of the car is shifted to the nomal cruising control.

As explained above, the present invention can provide a throttle control apparatus capable of switching controlling operations among the normal cruising control, the constant speed cruising control and the traction control. In addition, the control apparatus can be extremely simplified because the rack gear box is interposed between the accelerator wire and the throttle wire and the gear box is controlled by driving the motor.

Obviously, numerous modifications and variation of the present invention are possible in light of the above teaching. It is therefore to be understood that within the scope of the appended claims, the invention may be practiced otherwise than as specifically described herein.

What is claimed is:

1. A throttle control apparatus, comprising:

a rack gear box which is adapted to be connected to a throttle wire for operating a throttle valve and is urged to an initial stage by a throttle return spring, an accelerator actuator which is arranged in the rack gear box, is adapted to be connected to an accelerator wire interlocked with an accelerator pedal and is urged to the initial stage by an accelerator return spring, a rack gear which is provided on the outer surface of the rack gear box, a driving motor including a pinion gear engaged with the rack gear through a clutch, and a pulley and a spring for urging the accelerator wire in a direction perpendicular to the moving direction of the accelerator wire.

2. A throttle control apparatus, comprising:

a rack gear box which is adapted to be connected to a throttle wire for operating a throttle valve and is urged to an initial stage by throttle return means, an accelerator actuator which is arranged in the rack gear box, is adapted to be connected to an accelerator wire interlocked with an accelerator pedal and is urged to the initial stage by accelerator return means, a rack gear which is provided on the outer surface of the rack gear box, a driving motor including a pinion gear engaged with the rack gear through a clutch, and means for urging the accelerator wire in a direction perpendicular to the moving direction of the accelerator wire.

* * * * *